(12) United States Patent
Shaikh et al.

(10) Patent No.: US 10,200,392 B2
(45) Date of Patent: Feb. 5, 2019

(54) ACQUIRING BROWSER DATA WITH APPLICATION DATA

(71) Applicant: PAYPAL, INC., San Jose, CA (US)

(72) Inventors: Zahid Nasiruddin Shaikh, Timonium, MD (US); Srivathsan Narasimhan, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 242 days.

(21) Appl. No.: 15/357,819

(22) Filed: Nov. 21, 2016

(65) Prior Publication Data

US 2018/0145998 A1 May 24, 2018

(51) Int. Cl.
 H04L 29/06 (2006.01)
(52) U.S. Cl.
 CPC .............................. H04L 63/1425 (2013.01)
(58) Field of Classification Search
 CPC ........ H04L 63/1425; H04L 29/06; G06F 8/30
 USPC .......................................................... 726/23
 See application file for complete search history.

(56) References Cited

U.S. PATENT DOCUMENTS

| | | | | |
|---|---|---|---|---|
| 9,503,451 B1 * | 11/2016 | Kane-Parry | ........... | H04L 63/083 |
| 10,063,579 B1 * | 8/2018 | Machani | .............. | H04L 63/1425 |
| 2009/0125719 A1 * | 5/2009 | Cochran | ................ | G06Q 30/02 |
| | | | | 713/171 |

OTHER PUBLICATIONS

Rahul Pangam; "7 Leading Fraud Indicators: From Fresh Cookies to Null Values"; https://sirnility.com;device-recon-results/; Mar. 10, 2016; Data Fraud; 3 pp.
Dann Albright; "What Are Supercookies, and Why Are They Dangerous?"; http://www.makeuseof.com/tag/what-are-supercookies-and-why-are-they-dangerous/; Mar. 25, 2016; 9 pp.
"What is a Super Cookie—Definition from Techopedia"; https://www.technopedia.com/definition/27310/super-cookie; at least as early as Nov. 21, 2016; 33 pp.
Courtney Imbert; "Beyond the Cookie: Using Network Traffic Characteristics to Enhance Confidence in User Identity"; SANS Technology Institute; Aug. 14, 2014; 34 pp.

* cited by examiner

Primary Examiner — Evans Desrosiers
(74) Attorney, Agent, or Firm — Haynes and Boone, LLP.

(57) ABSTRACT

The systems and methods that identify fraud committed using native applications and web applications are provided. A native application executing on a client device generates a pairing identifier. The pairing identifier is associated with native attributes that are used by a fraud detection system to identify fraudulent transactions. The native application also activates a browser and passes the pairing identifier to the browser. The browser associates the pairing identifier with web attributes that store browser data collected on the client device. The client device transmits native attributes together with the pairing identifier and also the web attributes together with the pairing identifier to the fraud detection system. The fraud detection system links the native attributes and the web attributes by the pair identifier, and uses the native attributes and the web attributes to identify fraud that is initiated on the client device.

18 Claims, 7 Drawing Sheets

US 10,200,392 B2

ACQUIRING BROWSER DATA WITH APPLICATION DATA

TECHNICAL FIELD

The disclosure generally relates to security, and more specifically to acquiring and linking browser data and application data in order to prevent network fraud.

BACKGROUND

Conventional fraud detection systems rely on browser data to connect an operator of an account to transactions. For example, when a transaction is initiated from the browser, the fraud detection systems collect attributes received from the browser and compare the attributes with already collected attributes and user data to determine risk associated with the transaction. The measure of risk may indicate whether a transaction is generated by an owner of the account or by a third party attempting to commit fraud.

The trend in technology, however, is to install native applications on a client device and use the native applications to initiate transactions that have previously been initiated from the browser. Because the native applications do not interact with the browser, the browser generated attributes are not provided to the fraud detection systems to measure risk of the transactions initiated from the native applications. Similarly, when a browser initiates transactions, native application attributes are not provided to the fraud detection systems to measure risk of the transactions initiated from the browser. As a result, some attributes available on the client device that the fraud detection systems may use to accurately measure risk are not provided to the fraud detection systems. This, in turn, increases the risk that the fraud detection system will not detect fraudulent transactions.

Figure 1:
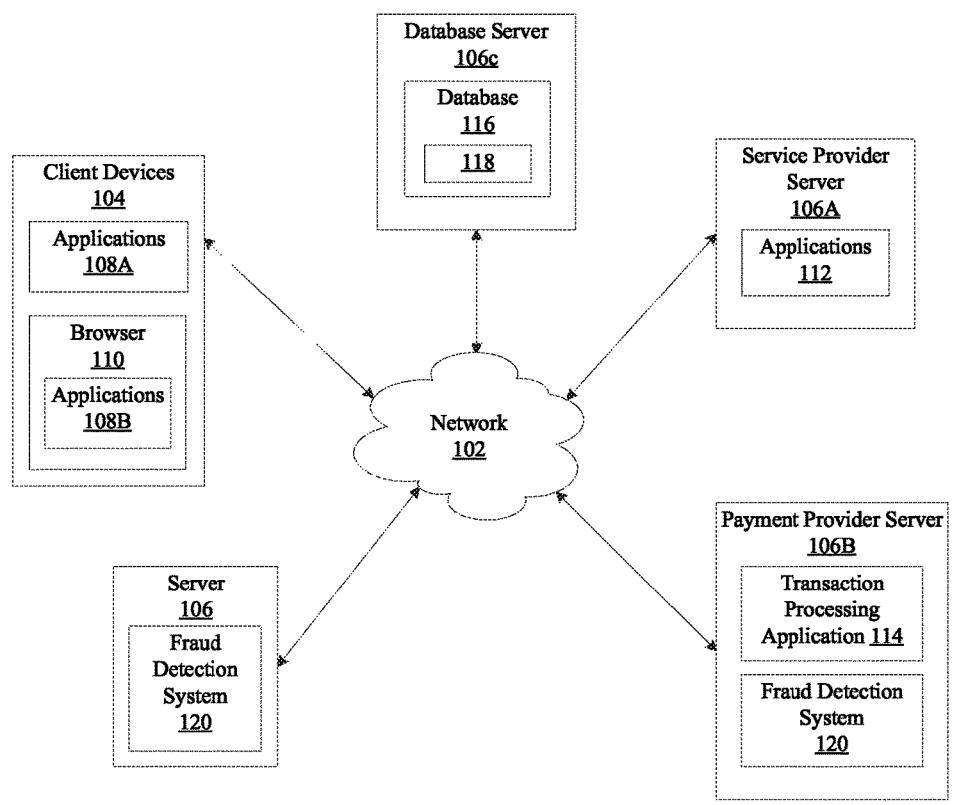
FIG. 1 is an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A client device includes one or more native applications and one or more browsers. Both native applications and browsers can be used to conduct transactions on behalf of a user using the client device. Native applications are installed on the client device and may have access to the client device's operating system, resources, and data. A browser, however, conducts transactions by accessing one or more web applications that are not installed on the client device. These web applications execute within a browser container and do not have direct access to the client device's operating system, resources, and data. Thus, to determine fraudulent transactions that may be committed from a browser, the fraud detection system would transmit a cookie to the browser. The browser would then use the cookie to store browser related attributes that the fraud detection system would use to identify a transaction as fraudulent.

Because conventionally, native applications and web applications operated as standalone entities, fraud detection systems would use web attributes to determine fraudulent transactions initiated from the browser and native attributes to determine fraudulent transactions initiated from the native application. However, because a fraudster can change from the native applications to web applications and vice versa to commit fraud on the same client device or client devices that are coupled together and interact with each other over WiFi or another local area network, the fraud detection systems could no longer determine the fraudulent transactions originating from these client device(s) accurately.

Described below are systems and methods for linking native attributes and web attributes (described below) generated on client device to detect fraud. In this way, a fraud detection systems use both native attributes and web attributes to determine fraudulent transactions. To link native attributes and web attributes, a native application is associated with a pairing identifier (also referred to as a pairing ID). For example, when the native application begins to execute, a software development kit ("SDK") or a library within SDK may be used to generate and assign a pairing ID to the native application. The native application may associate the native attributes with the pairing ID and transmit the native attributes and the pairing ID to the fraud detection system.

In an embodiment, when the native application begins to execute, the native application may also invoke a browser. The browser may be a visible browser which includes an interface that is visible to a user of the client device or an invisible browser that executes in the background of the client device and does not interact with the user. In an embodiment, the native application passes the pairing ID to the browser.

Once the browser begins to execute, the browser accesses the web attributes and sends web attributes along with the pairing ID to the fraud detection systems. In another embodiment, a browser may use a cookie that the fraud detection system has sent to the browser to receive web attributes. For example, the cookie gathers web attributes relevant to the fraud detection system from the browser and causes the browser to send the web attributes to the fraud detection system. In an embodiment, the cookie includes a fraud detection system generated client identifier that identifies the client device that is the source of the web attributes to the fraud detection system.

Because the fraud detection systems receive native attributes and web attributes with the same pairing ID, the fraud detection systems have access to both the native attributes and web attributes that were generated on the same client device. In this way, the fraud detection systems may use both native attributes and web attributes to determine whether one or more transactions initiated from the same client device or client devices that are coupled together, are fraudulent transactions, and also determine transactions where a fraudster uses both the native application and the browser to commit fraud.

FIG. 1 is an exemplary system 100 where embodiments can be implemented. System 100 includes a network 102, client devices 104, and servers 106.

In an embodiment, network 102 may be implemented as a single network or a combination of multiple networks. Network 102 may include the Internet or one or more intranets, landline networks, wireless networks, and/or other appropriate types of networks. Network 102 may be a small scale communication network, such as a private or local area network, or a larger scale network, such as a wide area network, accessible by the various components of system 100. In a further embodiment, network 102 may be a content delivery network that includes multiple proxy servers deployed in multiple data centers and which is adapted to distribute content, with high performance, all over the world.

In an embodiment, client devices 104 may be portable and non-portable electronic devices under control of a user and configured to transmit, receive, and manipulate data received from different servers 106 over network 102. Example client devices 104 include desktop computers, laptop computers, tablets, smartphones, wearable computing devices, eyeglasses that incorporate computing devices, implantable computing devices, etc.

Client devices 104 may include one or more applications 108. Example applications 108 may be native applications 108A and web applications 108B. Native applications 108A may be pre-installed on the client devices 104, installed on the client devices 104 using portable memory storage devices, such as compact disks or thumb-drives, or be downloaded to the client devices 104 from application stores that may be hosted on one or more servers 106. Native applications 108A may execute on the client devices 104 and receive instructions and data from a user, and send and transmit instructions and data to servers 106. In a further embodiment, native applications 108A may be applications that have been developed for use on a particular platform of client device 104 and that may have been written to specifically interact with a particular operating system type and features (such as iOS, Android, etc.) and a type of client device 104. Native applications 108A may be written in software programming languages such as Java, Objective C, Swift, etc. Because native applications are built to interact with a particular operating system and client device 104, native application 108A may have access to device specific hardware, operating system interface, and other applications installed on the client device, such as global positioning systems, camera and camera related applications, user usage and click patterns, network communication interface and attributes, etc. In an embodiment, native applications 108A may encompass non-browser related applications and can execute on client device 104 without being executed within a browser. In a further embodiment, native applications 108A may have access to memory storages, operating system interfaces, resources, and/or other processes of client device 104 that are not accessible to a browser and web applications 108B. In yet a further embodiment, native applications 108A may be applications that execute on client device 104 outside of a browser.

In an embodiment, web or browser applications 108B may also be accessed on client device 104. Web applications 108B may be client-server applications in which the client or user interface executes or runs within browser 110 (discussed below). In an embodiment, web applications 108B may be written in or supported using one or more web-based language, such as HyperText Markup Language ("HTML"), Cascading Style Sheets ("CSS"), etc. Web application 108B may be stored on server 106 as one or more web pages. Web application 108B may be accessed from server 106 using browser 110. In this case, browser 110 may access web application 108 after receiving a distinct Uniform Resource Identifier or a Uniform Resource Locator ("URI" or "URL"), from, for example, a user of client device 104. In an embodiment, web applications 108B may provide the same functionality as native applications 108A, and either one or both can be used interchangeably to conduct one or more transactions.

In an embodiment, browser 110 may be a software application executing on client device 104. Browser 110 may retrieve, present, and traverse information resources on the World Wide Web or simply the "web". In an embodiment, a resource is identified by a URI/URL and may be a web page, image, video or other piece of content stored on server 106 and may be received by browser 110 from a user of client device 104. As discussed above, browser 110 provides access to web applications 108B by accessing URI/URL of the respective web application 108B. Because the web applications 108B are provided to browser 110, web applications 108B do not typically have access to the system resources of client device 104 that are accessible to native applications 108A. Instead, web applications 108B may execute within a container that is browser 110 and rely on the browser's interface to interact with the operating system and other system resources of client device 104.

In an embodiment, native applications 108A and web applications 108B (collectively referred to as applications 108) may provide various services to users using client devices 104. Example applications 108 may be payment transaction applications. Payment transaction applications may be configured to transfer money world-wide, receive payments for goods and services, manage money spending, etc. Further, applications 108 may be under an ownership or control of a payment service provider, such as PAYPAL®, Inc. of San Jose, Calif., USA, a telephonic service provider, a social networking service provider, and/or other service providers. In an embodiment, applications 108 may also be analytics applications. Analytics applications perform business logic, provide services, and measure and improve performance of services and functions of other applications that execute on client devices 104 based on current and historical data. In another embodiment, applications 108 may be security applications for implementing client-side security features, programmatic client applications for interfacing with appropriate application programming interfaces (APIs) over network 102. In yet another embodiment, applications 108 may be communication applications, such as email, texting, voice, and instant messaging applications that allow a user to send and receive emails, calls, texts, and other notifications through network 102. In yet another embodiment, applications 108 may be location detection applications, such as a mapping, compass, and/or global positioning system (GPS) application. In yet another embodiment, applications 108 may be social networking applications and/or merchant applications. In yet another embodiment, applications 108 may be service applications that permit a user of client device 104 to receive, request and/or view information for products and/or services, and also permit the user to purchase the selected products and/or services.

In an embodiment, applications 108 may utilize numerous components included in client devices 104 to display data, receive input, store and transmit data, and communicate with other client devices 104 and servers 106 over network 102. Example components of client devices 104 are discussed in detail in FIG. 7.

In an embodiment, server 106 may be a computer device or a software program that provides functionality to other devices in network 102, such as client devices 104. In an embodiment, server 106 may serve multiple client devices 104. For example, server 106 may provide services and/or data to client devices 104, store data on behalf of client devices 104, etc. Example servers 106 may include service provider servers, payment provider servers, database servers, file servers, mail servers, print servers, application servers, game servers, etc. There may be hundreds or thousands of servers connected to network 102. Example service provider server 106A, payment provider server 106B, and database server 106C are described below.

In an embodiment, service provider server 106A may provide services to multiple applications 108 that execute on client devices 104. Service provider server 106A may also be maintained by a service provider, such as PAYPAL®, a telephonic service provider, social networking service, and/or other service providers.

In an embodiment, service provider server 106A executes applications 112. Applications 112 may receive, process, and transmit data for user requested products and/or services transmitted from client devices 104. Thus, applications 112 may be financial services applications configured to transfer money world-wide, receive payments for goods and services, manage money spending, etc. In an embodiment, applications 112 may also be security applications configured to implement client-side security features or programmatic client applications for interfacing with appropriate application programming interfaces (APIs) over network 102. In another embodiment, applications 112 may be communication applications that perform email, texting, voice, and instant messaging functions that allow a user to send and receive emails, calls, texts, and other notifications over network 102. In yet another embodiment, applications 112 may be location detection applications, such as a mapping, compass, and/or GPS applications. In yet another embodiment, applications 112 may also be incorporated into social networking applications and/or merchant applications.

In an embodiment, when applications 108 transmit requests and/or data to applications 112, applications 112 process the requests and data. In a further embodiment, applications 112 may request payment from a user using application 108 to process the requests. For example, applications 112 may use payment provider server 106B to process the payment requests. The payment provider server 106B may receive payment requests from applications 112 that cause the payment provider server 106B to transfer funds of a user using application 108 to the service provider associated with the service provider server 106A.

In an embodiment, payment provider server 106B includes one or more transaction or payment processing applications 114. Payment processing applications 114 facilitate transfer of funds between one or more parties, or applications, such as applications 108 and 112. In an embodiment, payment processing applications 114 may be configured to receive information from one or more applications 108 and/or applications 112 executing on client devices 104 and/or service provider server 106A for processing and completion of financial transactions. Financial transactions may include financial information corresponding to user debit/credit card information, checking account information, a user account (e.g., payment account with a payment provider server 106B), or other payment information. Payment processing application 114 may complete the financial transaction for the purchase request by providing payment to application 112 executing on service provider server 106A. In various embodiments, payment processing application 114 may provide transaction histories, including receipts, to client device 104 in order to provide proof of purchase for an item and/or service.

In an embodiment, in order to complete financial transactions (or other transactions), payment provider server 106B (or another server 106) may store transactions in database 116. Database 116 may be a collection of tables, schemas, queries, views, etc. that are stored in memory suitable to store large quantities of data, such as a memory described in FIG. 7. In an embodiment, database 116 may be hosted on database server 106C and is accessible to applications 108 and 112, and also payment processing application 114 via messages in a form of queries. In an embodiment, payment provider server 106B may establish user accounts 118 in database 116. Each user account 118 may be associated with one or more users using application 108 with payment provider server 106B to facilitate payment for goods and/or services offered by applications 112. User accounts 118 may include user information, such as name, address, birthdate, payment/funding information, travel information, additional user financial information, and/or other desired user data.

In another embodiment, system 100 also includes a fraud detection system 120. Fraud detection system 120 receives and stores attributes associated with transactions, applications 108, 112, and/or 114, client devices 104, user accounts 118, etc. Based on the attributes, fraud detection system 120 determines whether the transactions that originate on client devices 104 are genuine or fraudulent transactions. In an embodiment, fraud detection system 120 may be incorporated into the payment provider server 106B or be hosted on another server 106.

In an embodiment, fraud detection system 120 may be a large scale data and decision crunching system. This means that fraud detection system 120 obtains data from network 102 and uses machine learning and other algorithms to create correlations and patterns within data. For example, fraud detection system 120 may use correlations between data generated from client device 102, such as data specific to client device 102, transaction data, user account data, browser data, etc., to identify genuine and fraudulent transactions. As a result, the more data that fraud detection system 102 receives from client device 102 that the fraud detection system 120 can correlate, the more accurately the fraud detection system 120 can identify a fraudulent transaction.

Figure 2:
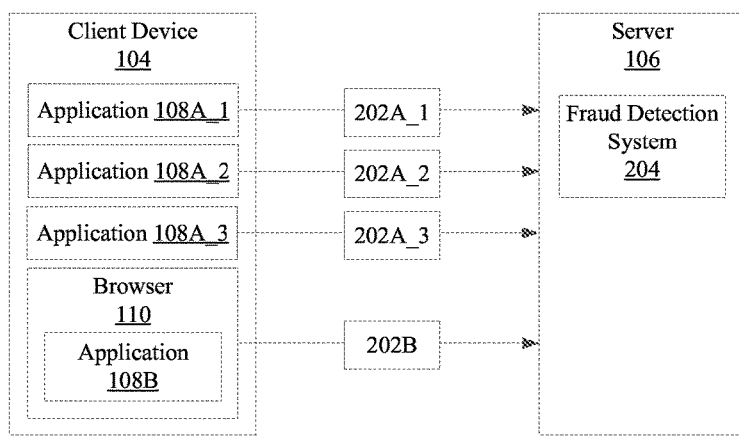
FIG. 2 is a block diagram of a prior art fraud detection system that determines whether a transaction is fraudulent, according to an embodiment.

FIG. 2 is a block diagram of a conventional fraud detection system, according to an embodiment. As illustrated in FIG. 2, native applications 108A and web application 108B execute on client device 104. The native applications 108A transmit native attributes 202A to the conventional fraud detection system 204. The web application 108B transmits native attributes 202B to the conventional fraud detection system 204.

As illustrated in FIG. 2, three native applications 108A_1, 108A_2, 108A_3 execute on client device 104. In an embodiment native application 108A_1 may be associated with the payment provider, native application 108A_2 may be associated with a first service provider and conducts transactions using the payment provider server 106B, and native application 108A_3 may be associated with a second service provider and conducts transactions using payment provider server 106B. In addition, web application 108B may also be executing within browser 110 on client device 104. Web application 108B may provide similar functionality to native applications 108A_1, 108A_2, and/or 108A_3, but may be executing on a remote server and have an interface displayed on browser 110B.

When native application 108A begins to execute on client device 104, native application 108A may generate native attributes 202A. For example, native application 108A_1 generates native attributes 202A_1, native application 108A_2 generates native attributes 202A_2, and native application 108A_3 generates native attributes 202A_3. The native attributes 202A_1, 202A_2, and 202a_3 may include attributes of the native applications 108A_1, 108A_2, and 108A_3, user account information, information associated with client device 104, geo-location data, etc. Because native applications 108A_1, 108A_2, 108A_3 are installed on client device 104, native attributes 202A_1, 202A_2, and 202A_3 may include device information that is specific to client device 104 and is not accessible to web application 108B. For example, native attributes 202A may include device-based attributes (e.g. unique identifiers like the IP (Internet Protocol) address, IMEI (International Mobile Equipment Identity), MAC (media access control) address, device model, user settings attributes (such as device name, device language etc.), network specific attributes such as connection type and bandwidth, operating system platforms (device platforms such as iOS, Android etc. and internet of things ("IOT") platforms such as Brillo, Eddystone, etc.) attributes such as platform version, distribution etc., server-generated attributes (such as unique identifiers generated by the server), etc. In an embodiment, each native application 108A_1, 108A_2, 108A_3 transmits the respective native attributes 202A_1, 202A_2, and 202A_3 to the conventional fraud detection system 204.

In an embodiment, when browser 110 accesses and displays the interface of the web application 108B, browser 110 may collect and store web attributes 202B associated with web application 108B. Browser 110 may further collect web attributes 202B based on the user activity or user input to web application 108B. Example web attributes 202B may include user entered account information, geo-location data, transaction data, etc. To receive web attributes 202B, fraud detection system 120 may transmit a cookie to browser 110 that executes on client device 104. Browser 110 may store the cookie in memory storage accessible to the browser 110. A cookie may be a data structure or another piece of data designed to store attributes and state-full information pertaining to user's activity on browser 110. Browser 110 may the collect the data from the cookie and transmit the data to the fraud detection system 204 as web attributes 202B.

In conventional fraud detection systems 204, native attributes 202A_1, 202A_2, and 202A_3 from native applications 108A_1, 108A_2, and 108A_3, and web attributes 202B from web application 108B are not linked together. This means that when fraud detection system 204 determines transactions initiated by one of applications 108 as fraudulent, fraud detection system 204 may terminate the transactions that are initiated by the one of the application 108. If the fraudster switches to other native applications 108A or web application 108B that have not been determined as sources of the fraudulent transactions, the fraud detection system 204 may not determine these transactions are fraudulent and the transactions may still be processed by payment provider server 106B.

In another example, the conventional fraud detection system 204 may also not link native attributes 202A, such as native attributes 202A_1 from different instances of the same native application 108A_1. This means, that a fraudster can attempt to commit a fraudulent transaction using native application 108A_1. If the fraud detection system 204 identifies the transaction as a fraudulent transaction and terminates subsequent transactions from the native application 108A_1 on client device 104, then fraudster can uninstall the native application 108A_1, remove the locally stored data or a footprint of native application 108A_1, and subsequently re-install native application 108A_1. Because native attributes 202A_1 of the re-installed instance of native application 108A_1 may be different from the previous instance of native application 108A_1, fraud detection system 204 may not detect the fraudulent transactions generated by the re-installed native application 108A_1.

Figure 3:
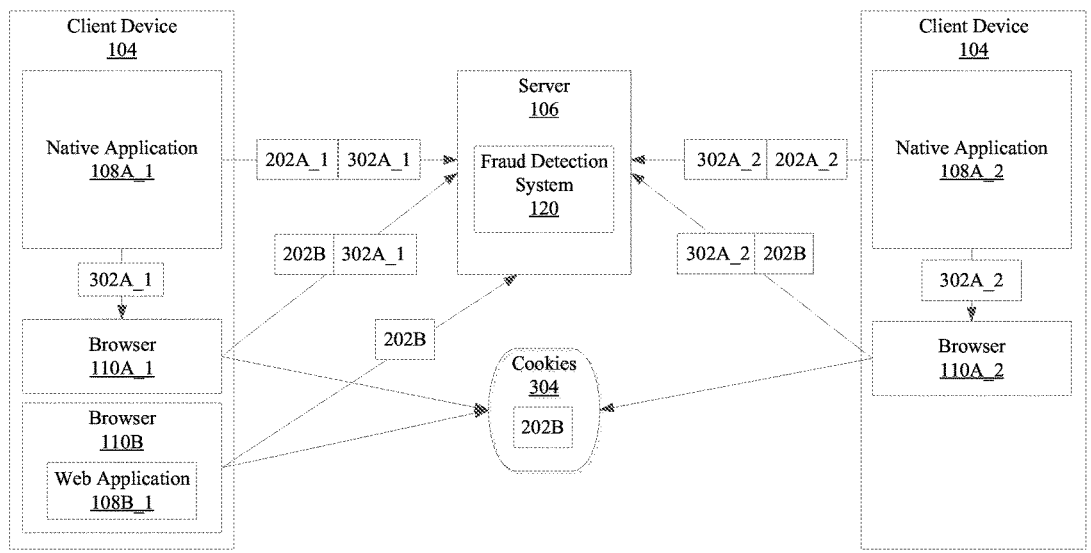
FIG. 3 is a block diagram of a system that links native attributes and web attributes to determine whether a transaction is fraudulent, according to an embodiment.

FIG. 3 is a block diagram 300 of a system environment that links native attributes 202A and web attributes 202B, according to an embodiment. As discussed in FIG. 2, native applications 108A and web applications 108B execute independently of each other and generate attributes 202 that are not linked together. As a result, when fraud detection system 204 determines a fraudulent transaction generated by native application 108A_1, the fraud detection system 204 may not necessary determine a fraudulent transaction generated by native application 108A_2 on the same client device 104. In order to improve fraud detection capabilities, the native attributes 202A generated by different native applications 108A may be linked with web attributes 202B stored on browser 110.

FIG. 3 includes client device 104 and server 106. In an embodiment, client device 104 includes native applications 108A (such as native applications 108A_1 and 108A_2), one or more instances of browser 110 (such as browser 110A and 110B), and web application 108B that executes within browser 110. For purposes of FIG. 3, the two client devices 104 illustrated in FIG. 3 represent different components of a single client device 104. In an embodiment, server 106 includes fraud detection system 120.

In an embodiment, a pairing identifier 302A (also referred to as a pairing ID 302A) may link native attributes 202A of native applications 108A with web attributes 202B accessible to the browser 110. The pairing ID 302A may be stored security within client device 104 such that the paring ID 302 may not be spoofed, hacked or duplicated. For example, native application 108A may store the pairing ID 302A within a secure memory space or location that is private to the native application 108A. In another example, pairing ID 302A may be stored within a secure memory space of the client device 104. Further, other security precautions may also be taken on client device 104 to security store the pairing ID 302.

In an embodiment, to link native attributes 202A and web attributes 202B, native application 108A may generate the pairing ID 302. The native application 108A may generate the pairing ID 302A when the native application 108A is activated or when native application 108A initiates a transaction, in some embodiments. The pairing ID 302A may be unique to an instance of native application 108A executing on client device 104 or to a session of native application 108A. For example, native application 108A_1 may generate pairing ID 302A_1 and associate native attributes 202A_1 with the pairing ID 302A_1. The native application 108A_1 may then transmit native attributes 202A_1 to the fraud detection system 120 together with pairing ID 302A_1. Similarly, native application 108A_2 may generate pairing ID 302A_2 and associate native attributes 202A_2 with the pairing ID 302A_2. The native application 108A_2 may then transmit native attributes 202A_2 to the fraud detection system 120 together with pairing ID 302A_2.

In an embodiment, to link native attributes 202A with web attributes 202B, native application 108A may instantiate an instance of browser 110. For example, native application 108A_1 may instantiate an instance of browser 110A_1, and native application 108A_2 may instantiate an instance of browser 110A_2. In one embodiment, browsers 110A_1 and/or 110A_2 may execute in the background and may not be visible or receive instructions from the user of client device 104. In another embodiment, browsers 110A_1 and/or 110A_2 may be visible on client device 104 and may receive and be controlled with input from the user. In a further embodiment, native application 108A may instantiate an instance of browser 110 once the native application 108A is activated.

In an embodiment, native application 108A may pass the pairing ID 302A to browser 110A. For example, native application 108A_1 may instruct browser 110A_1 to open a URL. The URL may include a location of server 106 that hosts fraud detection system 120. In an embodiment, the URL may also include pairing ID 302A_1 stored by native application 108A_1 or be appended to include pairing ID 302A as one of the parameters.

In an embodiment, as browser 110A begins to execute, browser 110A may receive cookies 304 from the fraud detection system 120. Cookies 304 may be data structures or other pieces of data sent from one or more websites accessed by browser 110A and are designed to store state-full information, such as a state of user's activity on browser 110A. In an embodiment, cookies 304 may store web attributes 202B. Browser 110A may access the web attributes 202B stored in cookies 304 and transmit the web attributes 202B with pairing ID 302A to the fraud detection system 120. For example, browser 110A may use Hypertext Transfer Protocol ("HTTP") to communicate with fraud detection system 102. When browser 110A begins to execute, browser 110A may access a URL that stores the location of the fraud detection system 120 on server 106 and issue an HTTP "GET" request to obtain one or more cookie 304 from the fraud detection system 120. Cookie 304 may include instructions, in for example, JavaScript or Ajax (asynchronous JavaScript and XML (Extensible Markup Language)) that may execute and obtain web attributes 202B and pairing ID from browser 110A. Once obtained, cookie 304 may cause browser 110A to issue a HTTP "POST" request to fraud detection system 120. The HTTP "POST" request may transmit the web attributes 202B along with pairing ID 302A to the fraud detection system 120 on server 106.

For example, when native application 108A_1 instantiates browser 110A_1, native application 108A_1 passes pairing ID 302A_1 to browser 110A_1. The browser 110A_1 may also receive a cookie 304 from the fraud detection system 120. The cookie 304 collects and stores web attributes 202B that are requested by the fraud detection system 120. As browser 110A_1 executes, browser 110A_1 retrieves web attributes 202B from cookie 304 and transmits the web attributes 202B to fraud detection system 120 together with pairing ID 302A_1. Similarly, when native application 108A_2 instantiates browser 110A_2, native application 108A_2 passes pairing ID 302A_2 to browser 110A_2. As browser 110A_2 executes, browser 110A_2 may receive cookie 304 from fraud detection system 120 or access an existing cookie 304 on client device 104. Browser 110A_2 may then transmit the web attributes 202B stored in cookie 304 together with pairing ID 302A_2 to the fraud detection system 120. Because fraud detection system 120 receives native attributes 202A_1 and web attributes 202B associated with the pairing ID 302A_1, and native attributes 202A_2 and/or web attributes 202B associated with pairing ID 302A_2, fraud detection system 120 may link native attributes 202A and web attributes 202B.

In an embodiment, one of web attributes 202B may be a fraud detection system generated client device identifier. The fraud detection system generated client device identifier may identify client device 104 to the fraud detection system 120 from web attributes 202B. Because, unlike native applications 108A, fraud detection system 120 does not have access to the operating system of client device 104, fraud detection system 120 cannot access the MAC address or other identifiers within client device 104 that uniquely identify client device 104. In one example, in order to uniquely identify client device 104, fraud detection system 120 may generate a unique client device identifier for client device 104 and transmit the client device identifier to browser 110 that executes on client device 104 as part of cookie 304. In an embodiment, when native application 108A_1 activates browser 110A_1, browser 110A_1 reads information stored in cookie 304, including the client device identifier, and transmits the client device identifier to the fraud detection system 120 as part of web attributes 202B and pairing ID 302A_1. When fraud detection system 120 receives native attributes 202A_1 with pairing ID 302A_1, the native attributes 202A_1 may include the MAC address of client device 104 or other client device 104 identifiers that are unique to client device 104 and are accessible to native applications 108A. The fraud detection system 120 can then use pairing ID 302A_1 to link the MAC address of client device 104 to the fraud detection system generated client device identifier, and use both to identify client device 104.

In an embodiment, once fraud detection system 120 receives native attributes 202A from one or more native applications 108A and web attributes 202B that are linked with pairing ID 302A, fraud detection system 120 associates the native attributes 202A and web attributes 202B with client device 104. In a further embodiment, fraud detection system 120 may also associate different native applications 108A, such as native applications 108A_1 and native applications 108A_2 with the same client device 104 via web attributes 202B. For instance, while pairing ID 302A_1 and pairing ID 302A_2 may be different for native applications 108A_1 and 108A_2, the client device identifier or other web attributes 202B that are accessed by different instances of browser 110, such as browsers 110A_1 and 110A_2 are the same. Fraud detection system 120 may then use client device identifier or other web attributes 202B to link native applications 108A_1 and 108A_2. In an embodiment, this feature may be useful, when one or more of native applications 108A_1 and 108A_2 may be uninstalled by the fraudster using client device 104 in order to clear native attributes 202A that are stored on client device 104. However, when one or more of native applications 108A_1 and 108A_2 are re-installed on client device 104, the fraud detection system 120 may use web attributes 202B stored in cookie 304 to relink the native attributes 202A from the re-installed native applications 108A with attributes for the client device 104 stored in the fraud detection system 120.

In a further embodiment, client device 104 may include browser 110B. Browser 110B may be an instance of browser 110 that includes a user interface. Browser 110B may provide access to web application 108B that may be a web version of one of native applications 108A. In an embodiment, web application 108B may also access cookie 304 to transmit web attributes 202B to the fraud detection system 120. In an embodiment, fraud detection system 120 may use the fraud detection system generated client device identifier to link web attributes 202B transmitted from web application 108B with native attributes 202A_1 generated by native application 108A_1. In this way, if fraud detection system 120 determines that one of native applications 108A have been used to conduct fraudulent transactions, then fraud detection system 120 may also reject transactions that were initiated by the web application 108B, or vice versa.

In another example, in order to uniquely identify client device 104, the fraud detection system 120 may access web attributes and native attributes stored from previous transactions sent form client device 104 (that are linked via pairing ID), and attempt to link the web attributes 202B to these web attribute and native attributes. One way fraud detection system 120 may attempt to link web attributes 202B is to compare one or more web attributes and/or native attributes stored in the fraud detection system 120 to one or more web attributes 202B sent from client device 104 and generate a score. The value of the score may indicate a probability of whether web attributes 202B and web attributes stored in the fraud detection system 120 are associated with the same client device 104.

Figure 4:
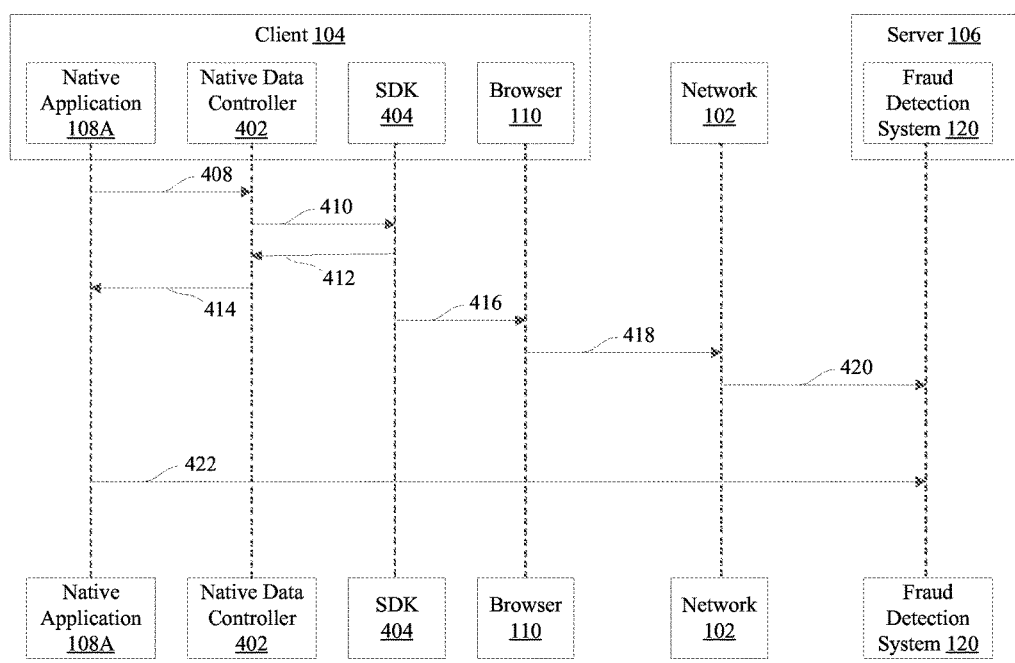
FIG. 4 is a sequence diagram that links native attributes and web attributes to determine if a transaction is fraudulent, according to an embodiment.

FIG. 4 is a sequence diagram 400 for linking native attributes from native applications and web attributes from a browser to determine if a transaction is fraudulent, according to an embodiment. Sequence diagram 400 includes a native application 108A, a native data collector 402, a software development kit ("SDK") 404, browser 110, network 102, and fraud detection system 120. As further illustrated in diagram 400, native application 108A, native data collector 402, SDK 404, and browser 110 may be executing or be coupled to client device 104, while fraud detection system 120 may be executing or be coupled to server 106.

In an embodiment, native data collector 402 may collect native attributes from or on behalf of native application 108A from client device 104.

In an embodiment, SDK 404 may be a library that includes application programming interfaces ("APIs") and services to develop native application 108A and also to provide system resources available on client device 104 to native application 108A. Additionally, SDK 404 may include APIs and services that native application 108A and/or native data collector 402 may use to communicate with browser 110.

As illustrated in diagram 400, at step 408, native application 108A issues a request for a pairing ID 302A. The request may be issued to the native data controller 402, or another component on client device 104 that may generate or collect data on behalf of native application 108A. In an embodiment (not shown), a request for the pairing ID 302A may also be issued to the server 106 or the fraud detection system 120.

Upon receipt of the request issued in step 408, native data controller 402 may generate pairing ID 302A, in one embodiment. In another embodiment, native data controller 402 may issue a request for the paring ID 302A to SDK 404, as illustrated in step 410. SDK 404 may generate the pairing ID 302A, and in step 412, SDK 404 may transmit the pairing ID 302A back to native data controller 402. In an embodiment, the native data controller 402 may store the pairing ID 302A on behalf of the native application 108A or as illustrated in step 414 transmit the pairing ID to native application 108A.

In an embodiment, upon generating the pairing ID 302A, in step 416, SDK 404 may transmit the pairing ID 302A to browser 110. Step 416 may be performed when native application 108A begins to execute, when native application 108A receives new user credentials, or when native application 108A begins to conduct a transaction, in some embodiments. Additionally, upon transmitting the pairing ID 302A to browser 110, SDK 404 may invoke a command that causes browser 110 to begin execution.

As discussed above, the pairing ID 302A links native attributes 202A generated by the native application 108A with web attributes 202B stored in cookies 304 in a memory storage associated with browser 110. For example, in step 418, browser 110 may cause client device 104 to transmit web attributes 202B and pairing ID 302A to network 102. Network 102, then in step 420 transmits the web attributes 202B and the pairing ID 302A to the fraud detection system 120.

Additionally, native application 108A may cause client device 104 to transmit native attributes 202A and the pairing ID 302A to the fraud detection system 120 as illustrated in step 422.

In an embodiment, when fraud detection system 120 receives native attributes 202A and web attributes 202B linked by a pairing ID 302A, fraud detection system 120 associates both native attributes 202A and web attributes 202B with client device 104 as discussed above.

The fraud detection system 120 can then link the data in the native attributes 202A with the data in the web attributes 202B via pairing ID 302A.

Figure 5:
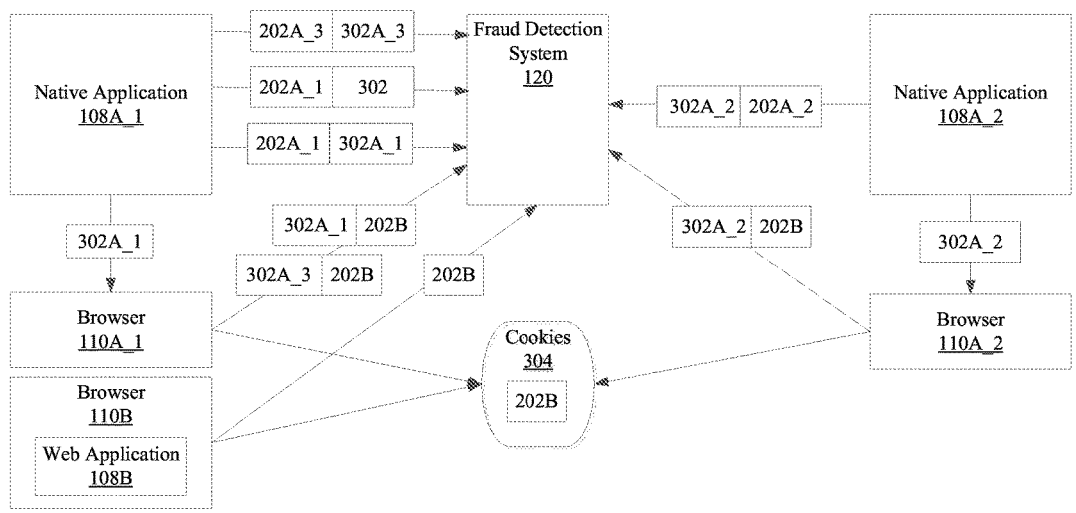
FIG. 5 is a block diagram that illustrates a fraud detection system detecting transaction fraud, according to an embodiment.

FIG. 5 is a block diagram 500 illustrating fraud detection system detecting a fraudulent transaction, according to an embodiment. FIG. 5 includes a fraud detection system 120, native applications 108A_1 and 108A_2, and a browser 110.

In one example, a fraudster initializes a first transaction from native application 108A_1 with a first user account. The fraud detection system 120 receives native attributes 202A_1 from native application 108A_1 and web attributes 202B from cookie 304 via browser 110A_1 instantiated by native application 108A_1. Native attributes 202A_1 and web attributes 202B are associated with a pairing ID 302A_1.

The native application 108A_1 then conducts several other transactions from different user accounts, which also transmit native attributes 202A_1 and web attributes 202B, but with different pairing IDs 302. The fraud detection system 120 may compare native attributes 202A_1 and web attributes 202B from these transactions. Because the native attributes 202A_1 and web attributes 202B are the same, but are associated with different pairing IDs 302 and with different user accounts, or because fraud detection system generated client device identifier is the same for different user accounts, fraud detection system 120 may determine that transactions generated from native application 108A_1 executing on client device 104 are fraudulent.

In an embodiment, because the fraud detection system 120 determined that native application 108A_1 on client device 104 is a source of fraudulent transactions, the native application 108A_1 may no longer be used to conduct transactions. In this case, fraudster may active an instance of browser 110, such as browser 110B and access web application 108B. In an embodiment, web application 108B may be a web version of the native application 108A_1. The fraudster may then try to use web application 108B to conduct fraudulent transactions via browser 110B. When a transaction is initiated from browser 110B, browser 110B may send web attributes 202B to fraud detection system 120. However, because fraud detection system 120 has already identified the fraud detection system generated client device identifier as being associated with client device 104 that conducts fraudulent transactions, fraud detection system 120 may prevent or terminate a transaction initiated from browser 110B.

In an embodiment, a fraudster may also uninstall and re-install native application 108A_1 on client device 104. During the uninstall/re-install process, native attributes 202A_1 associated with native application 108A_1 may be wiped out and deleted. As a result, when native application 108A_1 causes client device 104 to conduct a transaction, a reinstalled native application 108A_1 may transmit a different set of native attributes 202A_3 together with web attributes 202B, and a different pairing ID 302A_3. When fraud detection system 120 receives native attributes 202A_3, web attributes 202B, and a pairing ID 302A_3, fraud detection system 120 may compare web attributes 202B to the web attributes that were previously send to fraud detection system 120 from client device 104 or to the fraud detection system generated client device identifier and determine that the transaction has been sent from native application 108A_1 that has already been compromised on client device 104. As a result, fraud detection system 120 may terminate a transaction from a re-installed native application 108A_1. Conversely, if a genuine user deleted and re-installed the native application 108A_1, the set of attributes from browser 110A may reconnect with the new native attributes and pairing ID 302A from the re-installed native application 108A_1, and provide the genuine user with a smooth and seamless native application user experience.

In yet another embodiment, a fraudster may activate another native application, such as native application 108A_2. Native application 108A_2 may use the same payment provider server 106B to process transactions. Because native application 108A_2 is different from native application 108A_1, native application 108A_2 may transmit different native attributes 202A_2 to fraud detection system 120, together with web attributes 202B and pairing ID 302A_2. When fraud detection system 120 receives native attributes 202A_2 and pairing ID 302A_2, and web attributes 202B and pairing ID 302A_2, fraud detection system 120 may use web attributes 202B to determine that web attributes that were previously send to fraud detection system 120 from client device 104. This may further cause the fraud detection system 120 to determine that a fraudulent transaction has been sent from the client device 104. As a result, fraud detection system 120 may terminate a transaction from native application 108A_2 executing on client device 104.

Figure 6:
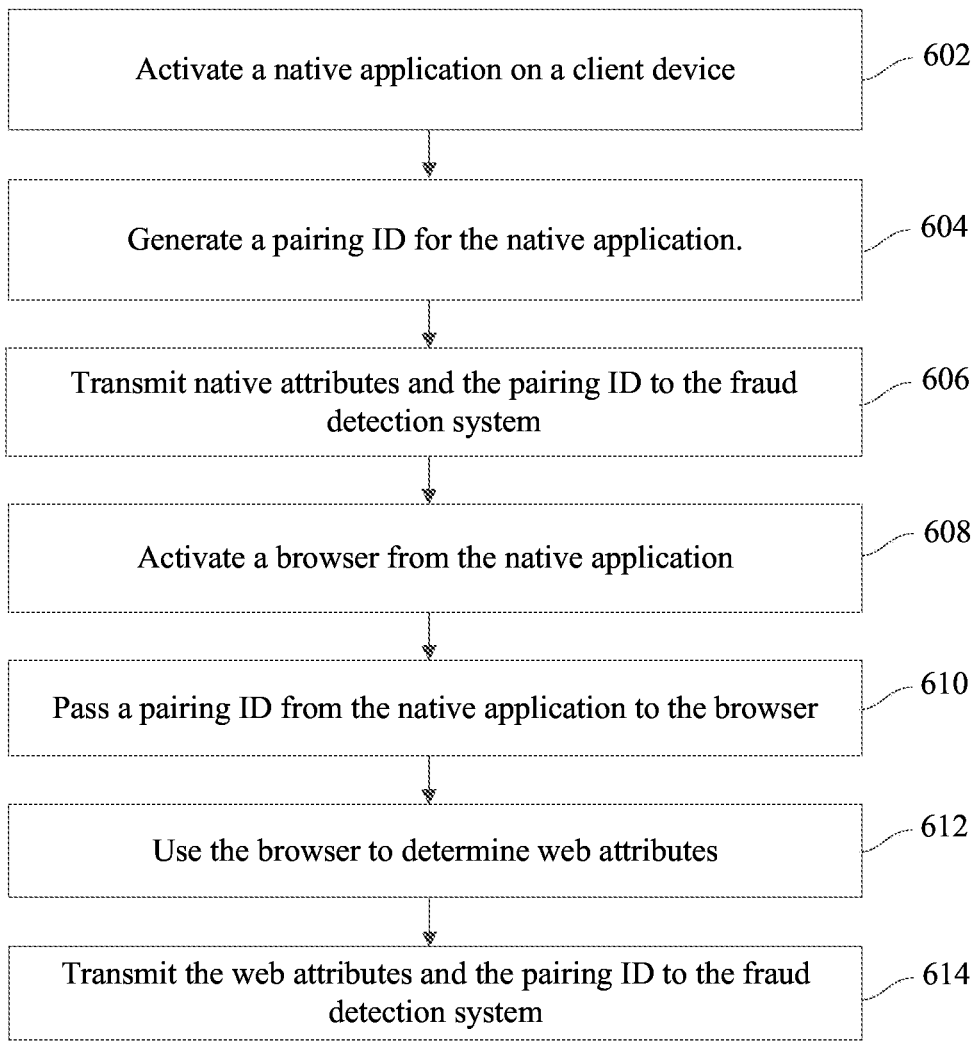
FIG. 6 is a flowchart of a method for linking native attributes and web attributes, according to an embodiment.

FIG. 6 is a flowchart of a method 600 for pairing native attributes and web attributes, according to an embodiment. Method 600 may be performed using hardware and/or software components described in FIGS. 1-5. Note that one or more of the operations may be deleted, combined, or performed in a different order as appropriate.

At operation 602, a native application is activated on a client device. For example, client device 104 receives input to activate native application 108A.

At operation 604, a pairing ID is generated. For example, native data controller 402 and/or SDK 404 generate pairing ID 302A for the native application 108A. As discussed above, pairing ID 302A may be generated for each session of the native application 108A.

At operation 606, native attributes and the pairing ID are transmitted to the fraud detection system. For example, native application 108A causes client device 104 to transmit native attributes 202A and the pairing ID 302A to the fraud detection system 120.

At operation 608, a browser is activated. For example, native application 108A activates browser 110A. As discussed above, browser 110A may be an invisible browser that executes in the background of client device 104 and does not display a user interface to a user.

At operation 610, pairing ID 302A is passed to the browser. For example, native application 108A passes pairing ID 302A to browser 110A. In an embodiment, the pairing ID 302A may be appended to the URL that access the fraud detection system 120.

At operation 612, web attributes are determined. For example, browser 110A may read cookie 304 that the fraud detection system 120 has transmitted to client device 104 when browser 110A was activated or when browser 110A has previously conducted a transaction. The cookie 304 may store or collect web attributes 202B that fraud detection system 120 had requested from browser 110A.

At operation 614, web attributes and the pairing ID are transmitted to the fraud detection system. For example, web attributes 202B and pairing ID 302A are transmitted to the fraud detection system 120. After operation 614 completes, fraud detection system 120 includes native attributes 202A and web attributes 202B that are linked by the pairing ID 302A. In this way, fraud detection system 120 may use both native attributes 202A and web attributes 202B to determine whether transactions initiated from client device 104 are fraudulent transactions.

Figure 7:
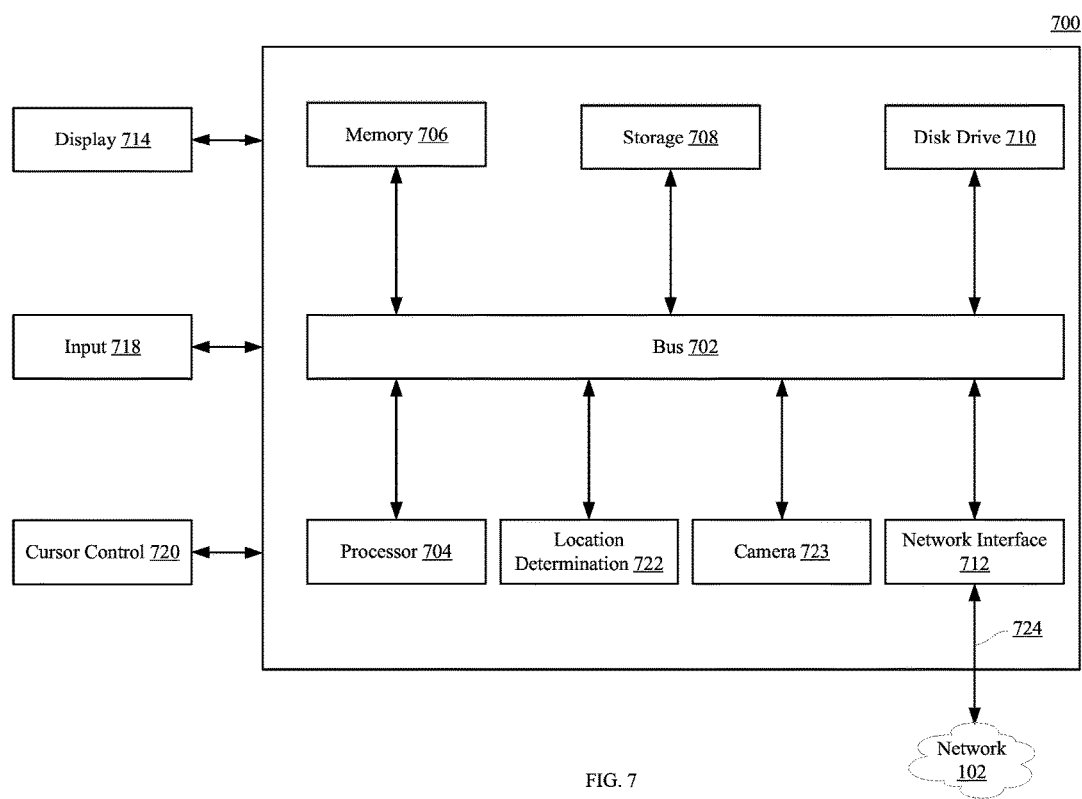
FIG. 7 is a block diagram of a computer system suitable for implementing one or more components in FIGS. 1-6, according to an embodiment.

Referring now to FIG. 7 an embodiment of a computer system 700 suitable for implementing, the systems and methods described in FIGS. 1-6 is illustrated.

In accordance with various embodiments of the disclosure, computer system 700, such as a computer and/or a server, includes a bus 702 or other communication mechanism for communicating information, which interconnects subsystems and components, such as a processing component 704 (e.g., processor, micro-controller, digital signal processor (DSP), graphics processing unit (GPU), etc.), a system memory component 706 (e.g., RAM), a static storage component 708 (e.g., ROM), a disk drive component 710 (e.g., magnetic or optical), a network interface component 712 (e.g., modem or Ethernet card), a display component 714 (e.g., CRT or LCD), an input component 718 (e.g., keyboard, keypad, or virtual keyboard), a cursor control component 720 (e.g., mouse, pointer, or trackball), a location determination component 722 (e.g., a Global Positioning System (GPS) device as illustrated, a cell tower triangulation device, and/or a variety of other location determination devices known in the art), and/or a camera component 723. In one implementation, the disk drive component 710 may comprise a database having one or more disk drive components.

In accordance with embodiments of the disclosure, the computer system 700 performs specific operations by the processor 704 executing one or more sequences of instructions contained in the memory component 706, such as described herein with respect to the mobile communications devices, mobile devices, and/or servers. Such instructions may be read into the system memory component 706 from another computer readable medium, such as the static storage component 708 or the disk drive component 710. In other embodiments, hard-wired circuitry may be used in place of or in combination with software instructions to implement the disclosure.

Logic may be encoded in a computer readable medium, which may refer to any medium that participates in providing instructions to the processor 704 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 710, volatile media includes dynamic memory, such as the system memory component 706, and transmission media includes coaxial cables, copper wire, and fiber optics, including wires that comprise the bus 702. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 700. In various other embodiments of the disclosure, a plurality of the computer systems 700 coupled by a communication link 724 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 700 may transmit and receive messages, data, information and instructions, including one or more programs (i.e., application code) through the communication link 724 and the network interface component 712. The network interface component 712 may include an antenna, either separate or integrated, to enable transmission and reception via the communication link 724. Received program code may be executed by processor 704 as received and/or stored in disk drive component 710 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
a non-transitory memory storing instructions; and
one or more hardware processors coupled to the non-transitory memory and configured to read the instructions from the non-transitory memory to cause the system to perform operations comprising:
generating a pairing identifier for a native application executing on a client device;
activating a browser from the native application, wherein the browser executes on the client device;
passing the pairing identifier generated by the native application to the browser;
determining native attributes associated with the native application, wherein the native attributes include data associated with the client device that is accessible to the native application;
associating the native attribute with the paring identifier;
determining web attributes associated with the browser, wherein the web attributes include data accessible to the browser;
associating the web attributes with the pairing identifier;
accessing a cookie stored in the browser accessible memory on the client device, wherein the cookie stores the web attributes and the cookie has been transmitted to the client device on behalf of the fraud detection system; and
transmitting the native attributes together with the pairing identifier and the web attributes stored in the cookie together with the pairing identifier to the fraud detection system, wherein the fraud detection system identifies a fraudulent transaction initiated from the client device by using the native attributes and the web attributes.

2. The system of claim 1, wherein the native application is an application that executes outside of the browser on the client device.

3. The system of claim 1, wherein the cookie stores a fraud detection system generated client device identifier.

4. The system of claim 1, wherein the generating further comprises:

invoking a software development toolkit library; and
causing the software development toolkit library to generate the pairing identifier for the native application.

5. The system of claim 1, wherein a fraudulent transaction initiated from the native application is detected based on the native attributes and the web attributes.

6. The system of claim 1, wherein a fraudulent transaction initiated from the browser is detected based on the native attributes and the web attributes.

7. A method, comprising:
generating a pairing identifier, wherein the pairing identifier links native attributes associated with a native application and web attributes associated with a browser;
determining the native attributes, wherein the native attributes include data associated with the client device that is accessible to the native application;
transmitting the native attributes and the pairing identifier to a fraud detection system;
activating the browser from the native application;
passing the pairing identifier to the browser;
determining the web attributes associated with the browser, wherein the web attributes include data accessible to the browser;
associating the web attributes with the pairing identifier;
accessing a cookie stored in the browser accessible memory on the client device, wherein the cookie stores the web attributes and the cookie has been transmitted to the client device on behalf of the fraud detection system; and
transmitting the web attributes stored in the cookie and the pairing identifier to the fraud detection system, wherein the fraud detection system determines a fraudulent transaction using the native attributes and the web attributes linked by the pairing identifier.

8. The method of claim 7, wherein the pairing identifier is generated by the native application.

9. The method of claim 8, further comprising:
invoking a software development toolkit library from the native application; and
causing the software development toolkit library to generate the pairing identifier for the native application.

10. The method of claim 7, wherein the native attributes and the web attributes transmitted from the client device identify a fraudulent transaction initiated from the client device.

11. The method of claim 7, wherein the native attributes and the web attributes identify a fraudulent transaction initiated by the native application.

12. The method of claim 7, wherein the native attributes and the web attributes identify a fraudulent transaction initiated by the browser.

13. The method of claim 7, wherein the native application is an application that executes outside of the browser on the client device.

14. A non-transitory computer-readable medium having stored thereon machine-readable instructions executable to cause a machine to perform operations comprising:
generating a pairing identifier for a native application executing on a client device;
determining native attributes associated with the native application, wherein the native attributes include data associated with the client device that is accessible to the native application;
transmitting the native attributes and the pairing identifier to a fraud detection system;
passing the pairing identifier generated for the native application to a browser executing on the client device;
determining web attributes associated with the browser, wherein the web attributes include data accessible to the browser;
accessing a cookie stored in the browser accessible memory on the client device, wherein the cookie stores the web attributes and the cookie has been transmitted to the client device on behalf of the fraud detection system; and
transmitting the web attributes stored in the cookie and the pairing identifier to the fraud detection system, wherein the fraud detection system links the native attributes and the web attributes using the pairing identifier.

15. The non-transitory computer-readable medium of claim 14, wherein the fraud detection system identifies a fraudulent transaction using the native attributes and the web attributes transmitted from the client device.

16. The non-transitory computer-readable medium of claim 14, wherein the cookie stores a fraud detection system generated client device identifier that identifies the client device to the fraud detection system.

17. The non-transitory computer-readable medium of claim 14, wherein the operations further comprise:
invoking a software development toolkit library from the native application; and
causing the software development toolkit library to generate the pairing identifier for the native application.

18. The non-transitory computer-readable medium of claim 14, wherein a fraudulent transaction initiated from the browser or from the native application is detected based on the native attributes and the web attributes.

* * * * *